US008990727B2

(12) United States Patent
Xia et al.

(10) Patent No.: US 8,990,727 B2
(45) Date of Patent: Mar. 24, 2015

(54) FISHEYE-BASED PRESENTATION OF INFORMATION FOR MOBILE DEVICES

(75) Inventors: Steven Qian Xia, Singapore (SG); Chang Zhang, Singapore (SG); Yean Fee Ho, Singapore (SG)

(73) Assignee: Sybase, Inc., Dublin, CA (US)

( * ) Notice: Subject to any disclaimer, the term of this patent is extended or adjusted under 35 U.S.C. 154(b) by 472 days.

(21) Appl. No.: 12/840,846

(22) Filed: Jul. 21, 2010

(65) Prior Publication Data

US 2012/0023438 A1    Jan. 26, 2012

(51) Int. Cl.
*G06F 3/048* (2013.01)
*G06F 3/0482* (2013.01)

(52) U.S. Cl.
CPC .... G06F 3/0482 (2013.01); *G06F 2203/04805* (2013.01)
USPC .......................................................... 715/783

(58) Field of Classification Search
CPC ..................... G06F 3/0482; G06F 2203/04805
USPC .......................................................... 715/783
See application file for complete search history.

(56) References Cited

U.S. PATENT DOCUMENTS

| 2003/0210267 | A1* | 11/2003 | Kylberg et al. | 345/762 |
| 2006/0059437 | A1* | 3/2006 | Conklin, III | 715/800 |
| 2007/0100799 | A1* | 5/2007 | Rose et al. | 707/3 |
| 2007/0100800 | A1* | 5/2007 | Rose et al. | 707/3 |
| 2007/0100915 | A1* | 5/2007 | Rose et al. | 707/205 |
| 2008/0086698 | A1* | 4/2008 | Hellman et al. | 715/783 |
| 2008/0174570 | A1* | 7/2008 | Jobs et al. | 345/173 |
| 2008/0309614 | A1 | 12/2008 | Dunton et al. | |
| 2009/0247233 | A1 | 10/2009 | Kim | |
| 2010/0070917 | A1* | 3/2010 | Gates et al. | 715/810 |
| 2010/0141605 | A1 | 6/2010 | Kang et al. | |
| 2010/0298034 | A1* | 11/2010 | Shin et al. | 455/566 |

FOREIGN PATENT DOCUMENTS

KR    10-2010-0027689 A    3/2010

OTHER PUBLICATIONS

English-Language Abstract of Korean Patent Publication No. 10-2010-0027689 A, published Mar. 11, 2010, from http://worldwide.espacenet.com; 1 page.

(Continued)

*Primary Examiner* — William Bashore
*Assistant Examiner* — Henry Orr
(74) *Attorney, Agent, or Firm* — Sterne, Kessler, Goldstein & Fox P.L.L.C.

(57) ABSTRACT

Embodiments relate to a computer-implemented method for graphically displaying or presenting a fisheye-based view of a large data list on the limited content viewing area of a mobile device. At least a subset of data rows within the data list and graphical representations of a plurality of data fields of at least the subset of data rows are generated and graphically displayed using a graphical user interface of the mobile device. When a user selects a focus row from the displayed data rows, a fisheye-based view of the selected focus row is presented. The fisheye-based view and the graphical representations of the data fields provide the user with a focus-plus-context view of a large data list. Further, the graphical representations provide the user with meaningful information even when particular data items are too small to read specific values.

23 Claims, 9 Drawing Sheets

(56) References Cited

OTHER PUBLICATIONS

International Search Report and the Written Opinion of the International Searching Authority directed to related International Patent Application No. PCT/US2011/044247, mailed Feb. 10, 2012, from the Korean Intellectual Property Office; 9 pages.

Bederson, Benjamin B., Fisheye Menus, Proceedings of ACM Conference on User Interface Software and Technology, May 2000, pp. 217-225, HCIL-2000-12, CS-TR-4138, UMIACS-TR-2000-31, ACM, New York.

Furnas, George W., Generalized Fisheye Views, Published in Human Factors in Computing Systems CHI '86 Conference Proceedings, Boston, Apr. 13-17, 1986, pp. 16-23, ACM 0-89791-180-6/86/0400.

\* cited by examiner

| | | | | |
|---|---|---|---|---|
| Form1 | | | | ✕ |
| A | Adam | 19500 | 7/1/97 | Male |
| | Anthony | 29500 | 7/1/97 | Male |
| | Amanda | 39500 | 7/1/97 | Female |
| | Amy | 59500 | 7/1/97 | Female |
| B | Barry | 69500 | 7/1/97 | Male |
| | Barry | 79500 | 7/1/97 | Male |
| | Barry | 89500 | 7/1/97 | Male |
| C | Charlie | 99500 | 7/1/97 | Male |
| | Charlie | 10500 | 7/1/97 | Male |
| | Charlie | 11500 | 7/1/97 | Male |
| | Charlie | 12500 | 7/1/97 | Male |
| D | David | 13500 | 7/1/97 | Male |
| | David | 14500 | 7/1/97 | Male |
| | David | 15500 | 7/1/97 | Male |
| | David | 16500 | 7/1/97 | Male |
| E | Eric | 44500 | 3/1/97 | Male |
| | Edward | 45500 | 4/1/97 | Male |
| F | Frank | 46500 | 5/1/97 | Male |
| H | Henry | 47500 | 6/1/97 | Male |
| | James | 48500 | 4/10/97 | Male |
| J | James | 49500 | 7/1/97 | Male |
| | Jane | 53870 | 7/1/99 | Female |
| | Janet | 37730 | 7/2/97 | Female |
| | Janet | 27270 | 7/3/97 | Female |
| K | Karl | 17500 | 7/4/97 | Male |
| | Kat | 18500 | 7/1/97 | Male |
| L | Larry | 19500 | 7/1/97 | Male |
| | Luke | 20500 | 7/1/97 | Male |
| M | Mike | 21500 | 7/1/97 | Male |
| | Mary | 22500 | 7/1/97 | Female |
| | Mike | 23500 | 7/1/97 | Male |
| | Mike | 24500 | 7/1/97 | Male |
| | Mike | 25500 | 7/1/97 | Male |
| | Mike | 26500 | 7/1/97 | Male |
| | Mike | 27500 | 7/1/97 | Male |
| | Mike | 28500 | 7/1/97 | Male |
| | Mike | 29500 | 7/1/97 | Male |
| | Mike | 30500 | 7/1/97 | Male |
| N | Nate | 31500 | 7/1/97 | Male |
| | Nate | 32500 | 7/1/97 | Male |
| | Nate | 33500 | 7/1/97 | Male |
| | Nate | 34500 | 7/1/97 | Male |
| | Nate | 35500 | 7/1/97 | Male |
| | Nate | 36500 | 7/1/97 | Male |
| R | Robert | 37500 | 7/1/97 | Male |
| | Robert | 38500 | 7/1/97 | Male |
| | Robert | 39500 | 7/1/97 | Male |
| | Robert | 40500 | 7/1/97 | Male |
| S | Sam | 41500 | 7/1/97 | Male |
| | Sam | 42500 | 7/1/97 | Male |
| | Sam | 43500 | 7/1/97 | Male |
| | Sam | 44500 | 7/1/97 | Male |
| T | Tim | 45500 | 7/1/97 | Male |
| | Tom | 46500 | 7/1/97 | Male |
| | Tiara | 47500 | 7/1/97 | Female |

FIG. 3

| | | | | | |
|---|---|---|---|---|---|
| 01/06 | 12/02/2010 | 70% | $450450 | ○Agreed | NetGear |
| | 03/08/2010 | 65% | $450450 | ○Close Lost | NetGear |
| | 12/02/2010 | 30% | $450450 | In Contract | NetGear |
| | 03/08/2010 | 25% | $450450 | ○Qualified | NetGear |
| | 12/02/2010 | 10% | $450450 | ○Close Lost | NetGear |
| | 03/08/2010 | 70% | $450450 | ○Close Lost | NetGear |
| | 12/02/2010 | 60% | $445928 | ○Qualified | NetGear |
| | 03/08/2010 | 25% | $745928 | ○Agreed | NetGear |
| 06/06 | 12/02/2010 | 60% | $100983 | ○Qualified | NetGear |
| | 05/03/2010 | 75% | $245928 | ○Agreed | NetGear |
| 01/07 | 12/02/2010 | 35% | $563342 | ○Qualified | NetGear |
| | 05/03/2010 | 75% | $445928 | ○Agreed | NetGear |
| 06/07 | | | | | |
| 07/07 | | | $302930 | | |
| 08/07 | 30% | | | | |
| 09/07 | | | ○Qualified | | 12/02/2010 |
| 10/07 | | | | | |
| 11/07 | | | | | |
| 12/07 | 12/02/2010 | 25% | $563342 | ○Qualified | NetGear |
| 01/08 | 05/03/2010 | 85% | $245928 | ○Agreed | NetGear |
| 06/08 | 12/02/2010 | 75% | $100983 | ○Qualified | NetGear |
| | 05/03/2010 | 60% | $445928 | ○Agreed | NetGear |
| | 12/02/2010 | 60% | $4459.28 | ○Qualified | NetGear |
| 01/09 | 05/03/2010 | 25% | $7459.28 | ○Agreed | NetGear |
| | 12/02/2010 | 75% | $4504.50 | Qualified | NetGear |
| | 03/08/2010 | 70% | $4504.50 | Close Lost | NetGear |
| | 12/02/2010 | 25% | $4504.50 | ○In Contract | NetGear |
| | 03/08/2010 | 20% | $4504.50 | ○Qualified | NetGear |
| | 12/02/2010 | 10% | $4504.50 | Close Lost | NetGear |
| | 03/08/2010 | 80% | $4504.50 | Close Lost | NetGear |
| | 12/02/2010 | 70% | $4504.50 | ○Agreed | NetGear |
| | 03/08/2010 | 50% | $4504.50 | Close Lost | NetGear |
| | 12/02/2010 | 50% | $4504.50 | ○In Contract | NetGear |
| 06/09 | 03/08/2010 | 25% | $4504.50 | ○Agreed | NetGear |
| | 12/02/2010 | 10% | $4504.50 | Close Lost | NetGear |
| | 03/08/2010 | 80% | $4504.50 | Agreed | NetGear |
| | 03/08/2010 | 55% | $4504.50 | ○Agreed | NetGear |
| | 12/10/2010 | 80% | $4504.50 | Close Lost | NetGear |
| | 03/08/2010 | 50% | $4504.50 | ○In Contract | NetGear |
| | 12/10/2010 | 55% | $4504.50 | ○Agreed | NetGear |
| | 03/08/2010 | 40% | $4504.50 | Close Lost | NetGear |
| | 12/10/2010 | 55% | $4504.50 | Close Lost | NetGear |
| 01/10 | 03/08/2010 | 35% | $4504.50 | ○Agreed | NetGear |

FIG. 4

| | Level 1 | Level 2 | Level 3 | Level 4 | Level 5 |
|---|---|---|---|---|---|
| Number | 80 % / 30 % | 80 % / 30 % | 80 % / 30 % | 80 % / 30 % | 80 % / 30 % |
| Text | NetGear | NetGear | NetGear | NetGear | NetGear |
| Date/Time | 25/10/2008 20/01/2010 | 25/10/2008 20/01/2010 | 25/10/2008 20/01/2010 | 25/10/2008 20/01/2010 | 25/10/2008 20/01/2010 |
| Image (only in detail) |  | | | | |
| Enum | ○ Qualified<br>○ Agreed<br>◉ In Contract<br>○ Close Won<br>● Close Lost | ○ Qualified<br>○ Agreed<br>◉ In Contract<br>○ Close Won<br>● Close Lost | ○ Qualified<br>○ Agreed<br>○ In Contract<br>◉ Close Won<br>● Close Lost | ○ Qualified<br>○ Agreed<br>○ In Contract<br>○ Close Won<br>● Close Lost | ○ Qualified<br>○ Agreed<br>○ In Contract<br>○ Close Won<br>● Close Lost |

FIG. 6

FISHEYE-BASED PRESENTATION OF INFORMATION FOR MOBILE DEVICES

BACKGROUND

1. Field

Embodiments relate generally to the field of mobile devices, particularly to the presentation of information using a mobile device.

2. Background

The emergence and development of mobile computing devices allows users to access pertinent information from almost anywhere, without needing to be bound to a specific geographic location. Such users can use these devices to view relevant data while, for example, traveling from one physical location to another. This is particularly advantageous in a business environment, where mobile devices continue to become prevalent. Many business users from diverse occupations rely on the devices to access data in the field. Some subset of the universe of data is commonly downloaded, or synchronized, to these mobile devices for viewing in the field.

While the small size of mobile device aids in portability, the size may also prove to be a hindrance for some users and applications, particularly for enterprise mobile users who need to view large amounts of data in the field. Such enterprise users may have difficulty viewing the data on the limited screen space of a mobile device. For example, the user may have trouble navigating a list of data items that may be too long to fit on a single screen. In addition, data items within the list may be too small for the user to read.

To aid users in viewing data items on a display screen, fisheye viewing techniques have been developed in which an item selected to be the focus is displayed in full size while other items are reduced in different degrees of size according to their distance from the item of focus. However, traditional fisheye viewing techniques suffer from several limitations for viewing large data sets on mobile devices, which preclude them from being commercially viable solutions for mobile users.

One limitation associated with traditional fisheye techniques is that they are applicable only to short lists, such as menus. Traditional techniques make it difficult for users to browse large data lists that may extend beyond the current viewing area of a mobile device screen. Such a limitation make traditional techniques inapplicable to applications that need to display long data lists on small display screens (e.g. mobile devices). Another limitation is that most data items displayed using traditional fisheye techniques are too minimal in size to provide any meaningful information to the user. Consequently, displaying such items amounts to wasting valuable screen space.

Thus, users need a capability to view and quickly navigate a long list of data using a mobile device. Further, application developers need a new fisheye-based mechanism to display a large amount of data on a mobile device display screen or other small display that also provides meaningful information to users.

BRIEF SUMMARY

Embodiments relate to displaying a fisheye-based view of a large list of data items on a small screen, such as a display screen of a mobile device. In one embodiment, a computer-implemented method for displaying a fisheye-based view of a data list on a mobile device is provided. The data list is located on the mobile device and comprises data rows. The data rows of the data list have a plurality of data fields. Graphical representations of the plurality of data fields for at least a subset of the data rows are generated. The data rows, or at least the subset of data rows, and the generated graphical representations are graphically displayed using a graphical user interface of the mobile device. A selection of a focus row is received from the user via the graphical user interface. A fisheye-based view of the selected focus row is then graphically presented to the user. For the fisheye-based view, the selected focus row is displayed at a higher level of detail than other graphically displayed data rows. The user may determine relative values of the plurality of data fields by viewing the graphically displayed data rows and the graphical representations of the plurality of data fields even if sizes of the displayed data rows are too small to read specific values.

In another embodiment, a system for displaying a fisheye-based view of a data list on a mobile device comprises: a data visualization module and a user navigation module. The data visualization module is configured to access the data list on the mobile device. The data list comprises data rows having a plurality of data fields. The data visualization module is further configured to generate graphical representations of the plurality of data fields for at least a subset of the data rows of the data list. The data visualization module is further configured to graphically display at the least the subset of data rows and the generated graphical representations using a graphical user interface of the mobile device. The data visualization module is also further configured to graphically present to a user the fisheye-based view of a focus row. For the fisheye-based view, the focus row is displayed at a higher level of detail than other graphically displayed data rows. The user navigation module is configured to receive from the user, via the graphical user interface, a selection of the focus row from the graphically displayed data rows. The user may determine relative values of the plurality of data fields by viewing the graphically displayed data rows and the graphical representations of the plurality of data fields even if sizes of the displayed data rows are too small to read specific values.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number. Further, the accompanying drawings, which are incorporated herein and form part of the specification, illustrate the embodiments of present invention and, together with the description, further serve to explain the principles of the invention and to enable a person skilled in the relevant art(s) to make and use the invention.

FIG. 3 is an illustration of an exemplary graphical user interface displaying a fisheye-based view of a data list on a mobile device, according to an embodiment.

FIG. 4 is an illustration of another exemplary graphical user interface displaying a fisheye-based view of a data list on a mobile device, according to an embodiment.

FIG. 6 is a table showing exemplary levels of detail for displaying different types of data using a fisheye-based view of a data list on a mobile device, according to an embodiment.

DETAILED DESCRIPTION

Figure 1:
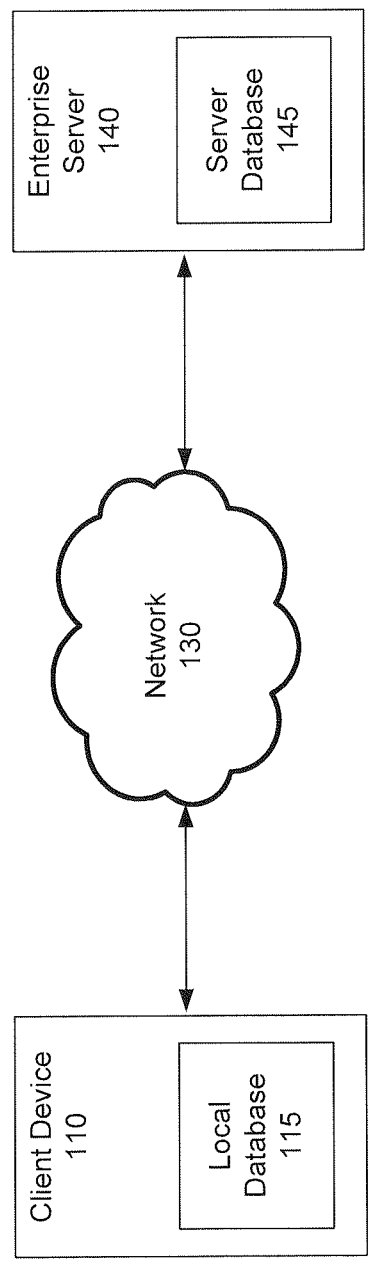
FIG. 1 is a diagram of an exemplary distributed system in which embodiments can be implemented.

Table of Contents
I. Introduction
II. System Overview
III. Fisheye-Based Presentation of a Data List on a Mobile Device
  A. Index Bar with Radar View
  B. Focus-Plus-Context View of Long Data Lists
  C. Performance Optimizations
IV. Example GUIs Displaying Fisheye-Based Views of Data Lists
  A. Basic Fisheye-Based View
  B. Fisheye-Based View with Graphical Visualization of Data Items
V. Method
  A. User Process for a Fisheye-Based View on a Mobile Device
  B. Presenting a Fisheye-Based View of Large Data Lists on a Mobile Device
VI. Example Computer System Implementation
VII. Conclusion I. Introduction Embodiments relate to graphically displaying or presenting a fisheye-based view of a large data list on the limited content viewing area of a mobile device. Commercial enterprise mobile database applications generally require the display of long lists of information. Embodiments enable the fisheye-based view of long data lists to be a viable solution for such commercial applications. As will be discussed in further detail below, embodiments further enable presenting a large amount of data on a small display screen while also conveying useful or meaningful information rows of data without having to read actual data values within the rows.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "display," "display screen," and "screen" are used interchangeably herein to refer broadly and inclusively to any type of display device or screen coupled to or integrated with a computing device for displaying content viewable by a user of the computing device. In an embodiment, the computing device is a mobile device. Such a display screen can include, for example and without limitation, a touch-screen liquid crystal display (LCD).

II. System Overview

FIG. 1 is an illustration of an exemplary distributed system 100 in which embodiments described herein can be implemented. Distributed system 100 includes a client device 110 that is communicatively coupled to enterprise server 140 through network 130. Client device 110 can be any type of mobile computing device having one or more processors, a user input (for example, a touch-screen, QWERTY keyboard, microphone, or a T9 keyboard), and a communications infrastructure capable of receiving and transmitting data over a network. For example, computing device 110 can include, but is not limited to, a mobile phone, a personal digital assistant (PDA), a tablet computer, a netbook computer, or other similar type of mobile device capable of processing instructions and receiving and transmitting data to and from humans and other computing devices. Enterprise server 140 can be any type of server or computing device capable of serving data to client device 110. For example, enterprise server 140 can include, but is not limited to, a computer or a cluster of computers that may be a part of a server farm.

Network 130 can be any network or combination of networks that can carry data communication. Such network can include, but is not limited to, a wired (e.g., Ethernet) or a wireless (e.g., Wi-Fi and 3G) network. In addition, network 130 can include, but is not limited to, a local area network, medium area network, and/or wide area network such as the Internet. Network 130 can support protocols and technology including, but not limited to, Internet or World Wide Web protocols and/or services. Intermediate network routers, gateways, or servers may be provided between components of distributed system 100 depending upon a particular application or environment.

In an embodiment, enterprise server 140 includes a server database 145. Server database 145 may store any type of data, including, but not limited to, data to be used for analytics applications, that is accessible by enterprise server 140. Although database 145 is shown as a component of server 140, database 145 may be communicatively coupled to server 140 via an indirect connection over a local, medium area, or wide area network. In addition, although only server database 145 is shown, additional databases may be used as necessary.

In an embodiment, client 110 includes a local database 115, which can be used to store data accessible by client device 110. For example, local database 115 may be implemented using any type of recording medium coupled to an integrated circuit that controls access to the recording medium. The recording medium can be, for example and without limitation, a semiconductor memory, a hard disk, or other similar type of memory or storage device. Moreover, local database 115 may be integrated within client device 110 or a stand-alone device communicatively coupled to client device 110 via a direct connection. For example, local database 115 may include an internal memory device of client device 110, a compact flash card, a secure digital (SD) flash memory card, or other similar type of memory device.

In an example, client device 110 may suffer from limitations such as reduced memory capabilities when compared to enterprise server 140. Therefore, data stored at local database 115 includes, but is not limited to, a subset of data found at server database 145. For example, local database 115 and server database 145 may each be relational databases. In an embodiment, the data stored at local database 115 can be synchronized with server database 145 over network 130. An example by which client device 110 can interact with enterprise server 140 to synchronize data is described in, but not limited to, commonly owned U.S. patent application Ser. No. 11/882,749, filed Aug. 3, 2007, titled "Unwired Enterprise Platform", which is herein incorporated by reference in its entirety. Additional means by which data may be provided to local database 115 would be apparent to a person skilled in the relevant art given this description.

III. Fisheye-Based Presentation of a Data List on a Mobile Device

Figure 2:
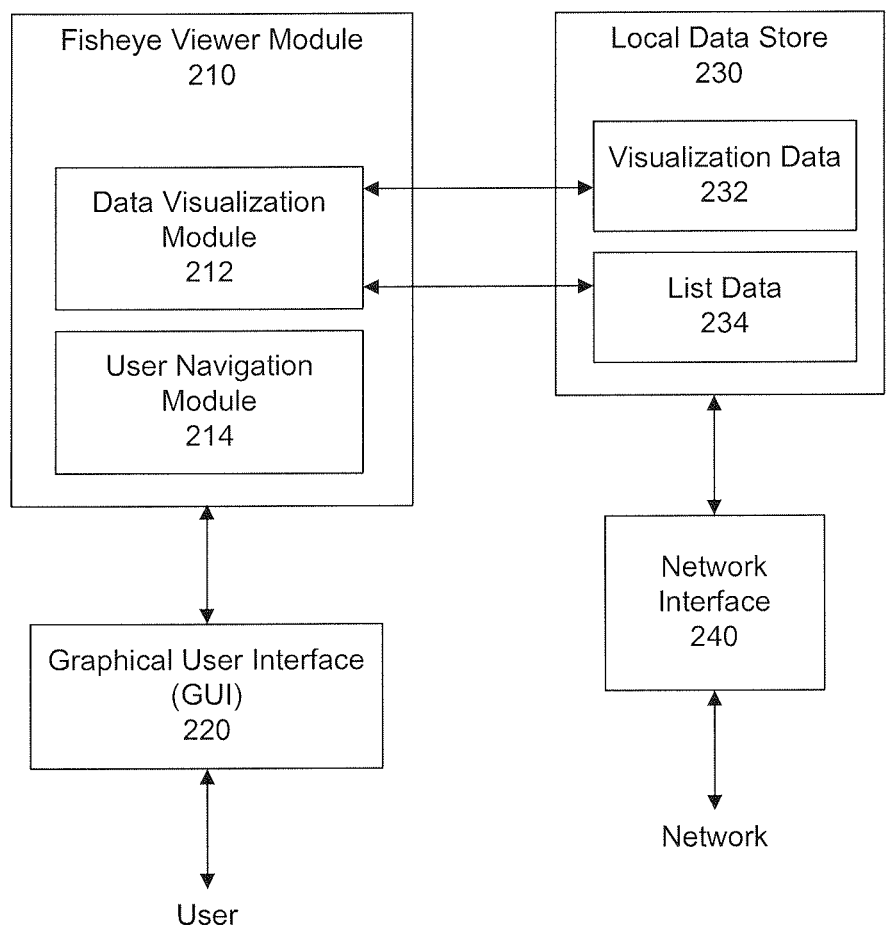
FIG. 2 is an architecture diagram of an exemplary device for displaying a fisheye-based view of a data list on a mobile device, according to an embodiment.

FIG. 2 is an architecture diagram of an exemplary device 200 for graphically displaying a fisheye-based view of a large data list on a mobile device, according to an embodiment. While the invention is described in terms of a mobile device, the invention is not limited to this example. The fisheye-based technology described herein is intended to be applicable to any display of any computing device. Device 200 includes a fisheye viewer module 210, a data visualization module 212, a user navigation module 214, a graphical user interface (GUI) 220, a local data store 230, visualization data 232, list data 234, and a network interface 240. Device 200 can be used to implement, for example and without limitation, client device 110 of FIG. 1.

In an embodiment, device 200 executes a fisheye viewer module 210. In an embodiment, fisheye viewer module 210 includes data visualization module 212 and user navigation module 214. Fisheye viewer module 210 is communicatively coupled to local data store 230 via, for example, an internal data bus of device 200. In an embodiment, local data store 230 is a lightweight database (e.g., local database 115 of FIG. 1) holding some subset of data from an enterprise server database (e.g., enterprise database 145 of FIG. 1). In an embodiment, device 200 uses network interface 240 to receive and update data stored at local data store 230 from the enterprise server over a network (e.g., network 130 of FIG. 1). In an example, local data store 230 may be configured to operate as a relational database, but is not intended to be limited thereto. A person skilled in the relevant art given this description will appreciate that local data store 230 may be configured using other data storage and retrieval mechanisms.

In an embodiment, local data store 230 includes visualization data 232 and list data 234. Visualization data 232 may include, but is not limited to, graphical user interface elements, such as user interface controls, and graphical image data. For example, the graphical user interface elements and/or graphical image data stored in visualization data 232 may be used by data visualization module 212 to graphically present information to a user through GUI 220.

List data 234 may include persistent data related to a mobile database application. For example, list data 234 may comprise rows of data corresponding to a set of rows or data records from one or more tables of a relational database in an enterprise system (e.g., server database 145 of FIG. 1). In an embodiment, device 200 uses network interface 240 to retrieve and update list data 234 from an enterprise server over a network, as described above. For example, when modifications or updates are made to one or more rows in a table of an enterprise relational database, network interface 240 may be used to synchronize such modifications and updates for the corresponding rows within list data 234.

Although not shown in FIG. 2, device 200 may include additional components depending on the type mobile application utilizing a fisheye-based view of list data as described herein. Further, embodiments described herein may be integrated with an enterprise mobile database application so that enterprise mobile users can utilize a fisheye-based view of a long list of data associated with an enterprise database. For example, device 200 may include a mobile analytics module that can be configured to evaluate analytics data and expressions for a mobile analytics application. In this example, list data 234 may comprise analytics data used by the mobile analytics module to evaluate expressions. Further description of such a mobile analytics module and its operation to evaluate expressions on a mobile device platform can be found in commonly owned U.S. patent application Ser. No. 12/632,963, entitled "Thin Analytics for Enterprise Mobile Users," which is incorporated by reference herein in its entirety.

A. Index Bar with Radar View

In an embodiment, data visualization module 212 graphically presents list data 234 to a user using GUI 220. List data 234 may comprise a large set of data items organized as rows, as described above. In addition, each row of list data 234 contains one or more data fields related to the various data items stored in the row. In an embodiment, data visualization module 212 displays a main list window comprising all or some subset of the data rows of list data 234 using GUI 220. For example, if the size of the display screen of device 200 is too small to fit all of the data rows of list data 234, only a subset of rows within list data 234 are displayed in the current view of the main list window. In a further embodiment, data visualization module 212 displays scroll buttons in the main list window enabling the user to scroll up or down to view additional data rows that stretch beyond the current view of the main list window (see, e.g., scroll buttons 440A and 440B of GUI 400 of FIG. 4).

The rows of list data 234 displayed in the main window are sorted by data visualization module 212 based on a single data field that is chosen as an index field. In an embodiment, the choice of index field is determined according to the index of the table as specified in a relational database to which list data 234 corresponds, as described above. In another embodiment, data visualization module 212 may be configured to enable the user at device 200 to select the index field for purposes of sorting the data displayed in the main window. It would be apparent to a person skilled in the relevant art that any number of well-known user interface controls may be employed using GUI 220 to enable the user to select the index field. For example, the user at device 200 may select the index field from a menu or drop-down list, displayed in GUI 220, comprising all of the data fields of the data rows of list data 234.

Additionally, data visualization module 212 displays an index bar that includes a range of index values for the entire list of data rows within list data 234. The data values of the index bar are based on the selected index field. The index bar displayed by data visualization module 212 serves two primary purposes. First, the index bar enables the user at device 200 to quickly navigate an entire list of data items and focus on certain data rows of interest. Second, the index bar provides important location awareness information by also including an indicator of the view position in the global context with respect to the entire data list.

For example, if list data 234 is large enough that some of its data rows stretch beyond the current screen or view of the main list window displayed in GUI 220, the index bar uses a view indicator to indicate to the user the range of rows that are currently displayed in the main list window. For example, the view indicator may be displayed as a highlighted box in the index bar that indicates the displayed range of data values relative to the global context for all data values (see, e.g., view indicator 415 of GUI 400 of FIG. 4, showing a main list window 420 in which the index field is a date field and the date range of the data rows displayed in the current view of main list window 420 is from "06/07" to "01/08" as indicated by view indicator 415).

The index range displayed in the view indicator may be referred to as a radar view of all of the index range values corresponding to all of the data rows of list data 234. In a further embodiment, additional graphical visualization elements may be employed by data visualization module 212 to clearly show the relationship between the values displayed in the radar view to the data rows displayed in the main list window (see, e.g., trapezoid 450 within index bar 410 of GUI 400 of FIG. 4, whose shape can be dynamically adjusted as the user scrolls up or down through the global list of data rows in list data 234). As will be discussed in further detail below, the index bar may also be fisheye-enabled or present a fisheye-based view of the index values, according to an embodiment.

B. Focus-Plus-Context View of Long Data Lists

In an embodiment, user navigation module 214 is configured to receive or detect user input from the user via GUI 220. In an example, GUI 220 may be implemented using a touch-screen of device 200, thereby enabling the user to use finger gestures to tap or select various portions of the index bar to quickly navigate or scroll through the data rows displayed in the main list window. Once input from the user is received, data visualization module 212 accordingly updates the main list window and index bar of GUI 220 based on the received input.

In addition to navigating the data list of the main list window using the index bar, the user may also select particular rows for viewing directly from the main list window. In an embodiment, user navigation module 214 enables the user to select a focus row from the main list window. For example, the focus row may contain data items that the user wishes to access at the particular moment.

In an embodiment, user navigation module 214 calculates the relative position of a detected user input in the main list window of GUI 220 with respect to the entire display screen. For example, user navigation module 214 may detect a tap of the user's finger on a touch-screen of device 200 and calculate the relative position of the tap in the whole display screen. This relative position is used by user navigation module 214 to determine the focus row.

For example, the height of the display screen of device 200 may be 480 pixels and list data 234 may contain 80 rows, where all of the rows fit on the display screen and in the current view of the main list window. In this example, if the user may click or tap at a pixel position Y=240 (where Y denotes the vertical dimension of the screen), user navigation module 214 would calculate the relative position to be the center of the screen and determine row 40, the center row, to be the focus row.

In an embodiment, user navigation module 214 uses the following formula to determine the focus row:

$$\text{focus row} = \frac{\text{position}}{\text{height}} \times \text{rows},$$

where "position" is the detected pixel position of the user input relative to the screen, "height" is the height in pixels of the display screen, and "rows" is equivalent to the total number of rows displayed in the current view of the main list window of GUI 220. For example, list data 234 may contain 1000 rows, but only 80 of the rows can be displayed effectively in the current view of the main list window of GUI 220. Thus, the value of the "rows" variable would be equivalent to 80.

In an embodiment, data visualization module 212 graphically displays a fisheye-based view based of the user selected focus row. Data visualization module 212 displays such a fisheye-based view using GUI 220 by presenting the focus row at a higher level of detail and/or magnification than other rows displayed in the main window. In an embodiment, the fisheye-based view is displayed by data visualization module 212 by presenting the focus row and some number of rows near the focus row at varying levels of detail and/or magnification in the main list window. In particular, the focus row is displayed at the highest degree of magnification and the rows near the focus are displayed, with respect to the focus row, at reduced degrees of magnification according to their respective distances from the focus row (see, e.g., rows 335 of FIG. 3, which shows an exemplary GUI 300, described in further detail below, displaying a fisheye-based view for rows 335 of data list 330 based on focus row 320).

In an embodiment, the focus row, unlike the other data rows displayed in the main list window, may be displayed at a higher level of detail with one or more graphical images corresponding to one or more data fields (see, e.g., FIG. 4, which shows an exemplary GUI where a focus row is displayed with graphical images corresponding to various data fields of the focus row). Thus, the level of detail for a data row decreases gradually as the distance from the focus row increases.

FIG. 6 is a table 600 that shows exemplary levels of detail for displaying different types of data using a fisheye-based view of a large data list on a mobile device, according to an embodiment. Level 1 of table 600 corresponds to the focus row while levels 2 though 5 correspond to data rows near the focus row. In an embodiment, only level 1, i.e., the level of detail for the focus row, displays graphical images for data fields, as illustrated by the "Image" row of table 600. Although five levels of detail are shown, a person skilled in the relevant art given this description would appreciate that more or fewer levels may be used as necessary.

Referring back to FIG. 2, the various data fields of each row of list data 234 displayed in the main list window may comprise data items of varying data types including, for example and without limitation, numerical data, enumerated data types, and/or text data. In an embodiment, data visualization module 212 generates graphical representations of a plurality of data fields for at least a subset of data rows of list data 234. Data visualization module 212 displays the data rows and the graphical representations of the data fields in the main list window. The graphical representation for a data field may be based on any one of various visualization techniques or schemes. Such visualization schemes may include, for example and without limitation, different colors, shapes, graphical images, or any combination thereof (see, e.g., the "Number" row of table 600 of FIG. 6, which shows percentage data values with a data bar to show relative value comparisons between different data items).

In a further embodiment, data visualization module 212 selects a visualization technique or scheme for a data field based on its data type (or the data type of the data item corresponding to the data field). In this embodiment, data visualization module 212 generates the graphical representations for the plurality of data fields of each data row of list data 234 based on the data types of the data fields. In an embodiment, visualization data 232 comprises graphical visualization information, which can be used by data visualization module 212 to determine the type of graphical visualization to use for a particular data type. For example, visualization data 232 may include a mapping of data types to graphical visualization metadata describing, for example, the size, shape, or image to use for displaying data of various data types.

One benefit of the visualization or graphical representation of data items or fields of each data row based on data types is that it allows the data rows displayed in the main list window to present meaningful information to users even at the smallest level of detail and size. For example, as visualized data items are scaled down, specific details (e.g., exact numerical values) become more difficult to view for the user. However, essential information (e.g., the relative value of a data item compared with other items) can still be conveyed to the user by displaying the generated graphical representations of the data fields. The user is able to make comparisons between the various data items presented in the main list window despite not being able to clearly view the specific details for each data item. Thus, the user may determine relative values of the plurality of data fields by viewing the graphically displayed data rows and the graphical representations of the plurality of data fields even if sizes of the displayed data rows are too small for the user to read specific values of the plurality of data fields.

Figure 5:
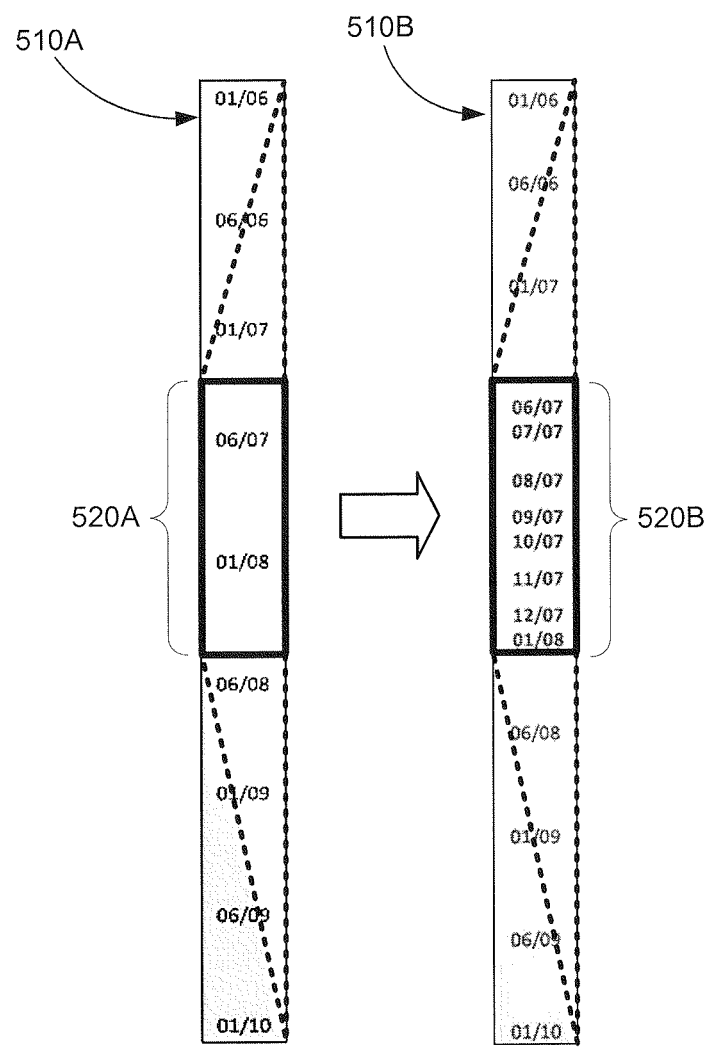
FIG. 5 shows an exemplary index bar that transitions from a default radar view to a fisheye-based radar view for a data list on a mobile device, according to an embodiment.

In an embodiment, the index bar may also be fisheye-enabled or present a fisheye-based view of the index values. FIG. 5 shows an exemplary index bar 500 that transitions from a default radar view 510A to a fisheye-based view 510B for a large data list on a mobile device, according to an embodiment. As illustrated in FIG. 5, view indicator 520A, in default radar view 510A, displays a range of date values from "06/07" to "01/08." As described above, these values represent the upper and lower bounds, respectively, of values corresponding to a date field, determined to be the index field, of all the data rows displayed in the current view of the main list window in GUI 220. In response to the user's selection of a focus row within the range of data rows displayed in the main list window of GUI 220, view indicator 520A transitions to view indicator 520B, according to an embodiment. As illustrated in FIG. 5, view indicator 520B, in fisheye-based view 510B, displays a more detailed view of the date values falling within the upper and lower data values based on the selected focus row.

For example, the selected focus row and data rows near the focus row may fall within the date range "06/07" to "12/07." Therefore, the fisheye-based view indicator 520B displays these values in greater detail. For a wide range of values between the upper and lower data values displayed in the view indicator, a benefit of a fisheye-based view of value ranges within the index bar is that the user views only a subset of these values that are closely related to the user-selected focus row. Viewing only a subset of a wide range of data values improves navigation precision and thereby enables the user to more quickly find data rows of interest. As the focus row changes, the values displayed in the view indicator are accordingly updated by data visualization module 212.

C. Performance Optimizations

Displaying a large number of data items on a single screen of a mobile device may result in performance issues. Such performance issues may be due to latencies related to rendering all data items of a large data set, particularly when graphical visualization information (e.g., graphical images) may be associated with each data item. Thus, embodiments of data visualization module 212 may employ one or a combination of optimization techniques to ensure responsiveness and improve user experience while viewing and navigating the data rows using GUI 220. Two examples of such optimization techniques are double buffering and partial and asynchronous rendering. A person skilled in the relevant art given this description would appreciate that additional optimization techniques may be used as necessary.

For double buffering, graphical images of minimized rows in the current view are generated and cached by data visualization module 212 as a background process. For example, data visualization module 212 may use local data store 230 or one or more cache memory devices of device 200 to cache the graphical images. When the user navigates data rows in the current view, data visualization module 212 updates GUI 220 using the cached images instead of generating new graphical representations or views of the data rows. An advantage of this type of optimization is that it significantly reduces the computation time and improves the responsiveness of GUI 220 from the user's perspective.

For partial and asynchronous rendering, only the magnified data rows (i.e., the focus row and some number of rows near the focus) are rendered and displayed by data visualization module 212 in real time. Thus, if the user, for example, uses the index bar to quickly browse or navigate the data rows displayed in the main window, only those magnified data items having a larger size are rendered and displayed in real-time. Data items having a minimal or smaller size are rendered in a separate thread, and graphical images generated from this thread are output to GUI 220 asynchronously. An advantage of using partial and asynchronous rendering is that it allows for the full use of a mobile device's capability in order to produce the best possible output for GUI 220 while also maintaining a smooth and responsive browsing experience for the user.

Fisheye viewer module 210 and its components (data visualization module 212 and user navigation module 214) can be implemented in software, firmware, hardware, or any combination thereof. Embodiments of fisheye viewer module 210, data visualization module 212, and user navigation module 214, or portions thereof, can also be implemented to run on any type of computing device. Such computing device can include, but is not limited to, a personal computer, mobile device such as a mobile phone, workstation, embedded system, game console, television, set-top box, or any other computing device capable of carrying out the functionality described herein.

IV. Example GUIs Displaying Fisheye-Based Views of Data Lists

FIGS. 3 and 4 illustrate exemplary non-limiting GUI 300 and GUI 400, respectively, displaying a fisheye-based view of a large list of data items (e.g., list data 234 of FIG. 2) on a mobile device (e.g., device 200 of FIG. 2). Additionally, GUI 300 and GUI 400 may be integrated with an enterprise mobile database application, such as a mobile analytics application, as described above. GUI 300 and GUI 400 are presented by way of example and not limitation. A person skilled in the relevant art given this description would appreciate that GUI 300 and/or GUI 400 may be implemented using additional user interface controls and graphical elements as necessary.

A. Basic Fisheye-Based View

FIG. 3 is an illustration of an exemplary non-limiting GUI 300 displaying a fisheye-based view of a large list of data items on a mobile device. GUI 300 may be implemented using, for example, GUI 220 of FIG. 2. GUI 300 includes an index bar 310 and a main list window 330. As illustrated by GUI 300, the rows of data displayed in main list window may be, for example, personnel records for employees of an organization. The data fields in each row may be, for example, a first name, employee identification number, hire date, and the sex of the employee.

It would be apparent to a person skilled in the relevant art given this description that personnel or employee data records are presented in GUI 300 by way of example, and not limitation, and that the principles described herein can be applied to a vast range of data available to a mobile application.

A user interacting with GUI 300 can navigate the list by selecting rows directly in main list window 330 or by using index bar 310. The selected index field, as described above, for the example illustrated in GUI 300 is the data field corresponding to an employee's first name. Consequently, index bar 310 provides an alphabetic index corresponding to, for example, the first letter of the first name data field for the personnel data list displayed in main list window 330. Thus, a user can use index bar 310 to quickly jump from one set of rows to another without having to manually scroll through the entire list presented in main list window 330.

As mentioned previously, GUI 300 displays a fisheye-based view of rows 335, in which rows 335 are magnified or displayed at a higher level of size and detail, relative to the remaining rows, based on focus row 320, which is selected by the user, as described above. As illustrated by GUI 300, focus row 320 is displayed at the highest level of size and detail. GUI 300 may also include additional user interface controls, such as keyboard control 340, which can be used by the user to, for example, edit one or more data fields of focus row 320. It would be apparent to a person skilled in the relevant art given this description that additional user interface controls and elements may be used as necessary for GUI 300.

B. Fisheye-Based View with Graphical Visualization of Data Items

FIG. 4 is an illustration of an exemplary GUI 400 displaying a fisheye-based view of a large data list on a mobile device, according to an embodiment. GUI 400 may also be implemented using, for example, GUI 220 of FIG. 2. GUI 400 includes an index bar 410 with a view indicator 415. GUI 400 also includes a main list window 420 with data rows 425 displayed in a greater level of detail, relative to the other rows in the main list window, with focus row 430 displayed at the highest level of detail.

As illustrated in GUI 400, various data fields of focus row 430 are graphically visualized using graphical images. In addition, data fields of other rows displayed in main list window 420 are displayed using other graphical visualization techniques. For example, data fields containing percentage values are displayed using a graphical bar, such as in a graphical bar chart. The graphical bar helps the user determine a relative value of a data item even if the data item may be too small to read its specific value.

As described above, other visualization techniques including, but not limited to, different shapes, colors, or images may be used to present information related to the data items to a user. Such graphical visualization techniques allow the user to quickly and effectively compare relative values of data items within the different rows displayed in main list window 420. Thus, even if the data items and rows are too small in size for the user to read specific values, the user is still presented with enough meaningful information to quickly and analyze the data.

Also as described above, additional graphical visualization elements may be employed in GUI 400 to clearly show the relationship between the values displayed in the radar view of view indicator 415 to the data rows displayed in main list window 420. For example, a trapezoid 450 may be displayed within index bar 410. Further, the shape of trapezoid 450 can be dynamically adjusted as the user scrolls up or down through the global list of data rows.

It would be apparent to a person skilled in the relevant art given this description that GUI 400 is presented by way of example, and not limitation, and that more or less graphical visualization techniques and elements can be used as necessary. Additionally, the principles described herein can be applied to a vast range of data available to a mobile application.

V. Method

A. User Process for a Fisheye-Based View on a Mobile Device

Figure 7:
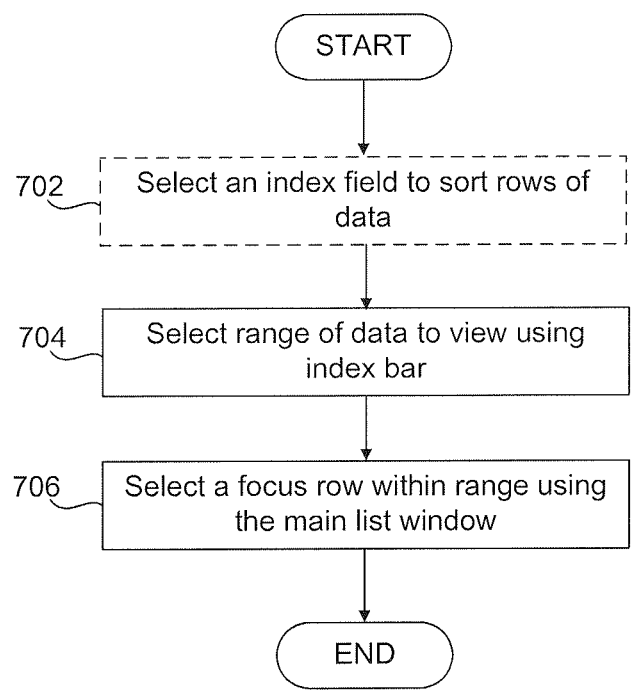
FIG. 7 is a process flow chart of an exemplary method by which a user can use a fisheye-based view of a data list on a mobile device to view and select items of interest from the data list, according to an embodiment.

FIG. 7 is a process flowchart of an exemplary method 700 by which a user is able to use a fisheye-based view of a large data list on a mobile device, according to an embodiment. Method 700 includes steps 702, 704, and 706. For ease of explanation, method 700 will be described in the context of GUI 400 of FIG. 4, but is not intended to be limited thereto.

In an embodiment, method 700 starts in step 702, which includes selecting an index field to sort rows of data. For example, in GUI 400, the data rows are sorted in numerical order according to a date field, which is also the selected index field. To select the index field from the all of the data fields corresponding to the data rows, the user may be presented, for example, a menu or scrollable drop-down list comprising all the data fields associated with the data rows. In another embodiment, the index field is selected automatically based on the index of a table of records to which the data rows correspond, as described above. In the first embodiment, in which the user selects the index field (in step 702), method 700 proceeds to 704 once the user has selected the index field.

In the latter embodiment, in which the index field is selected automatically, method 700 skips step 702 and starts in step 704.

In step 704, the user uses the index bar (e.g., index bar 410 of GUI 400) to select a range of data to view. For example, the user may select a particular date range in the index bar to view data rows corresponding to that date range. Once a particular range is selected by the user, the main list window (e.g., main list window 420 of GUI 400) is updated with data rows corresponding to the selected range. The number of rows displayed in the main list window and the size of the range displayed in the index bar depends on the number of rows that can be displayed on the screen, i.e., in the content viewing area of the main list window. A view indicator (e.g., view indicator 415 of GUI 400) is displayed in the index bar to indicate the relative position of the displayed rows with respect to the entire data list.

Once the user has specified the desired range of values to view, method 700 concludes in step 706, which includes the user selecting a focus row within the range of data rows displayed in the main list window. The user may, for example, select the focus row by selecting a particular row in the main list window, as described above. The selected focus row is then displayed using a fisheye-based view, also as described above.

The advantage of method 700 is that it provides an easy way for users to quickly view data items of a large data list using a mobile device. The data list is also presented using visualization techniques, such as size, shape, and color, to provide the user with meaningful information regarding relative values of the data even in small sizes.

B. Presenting a Fisheye-Based View of Large Data Lists on a Mobile Device

Figure 8:
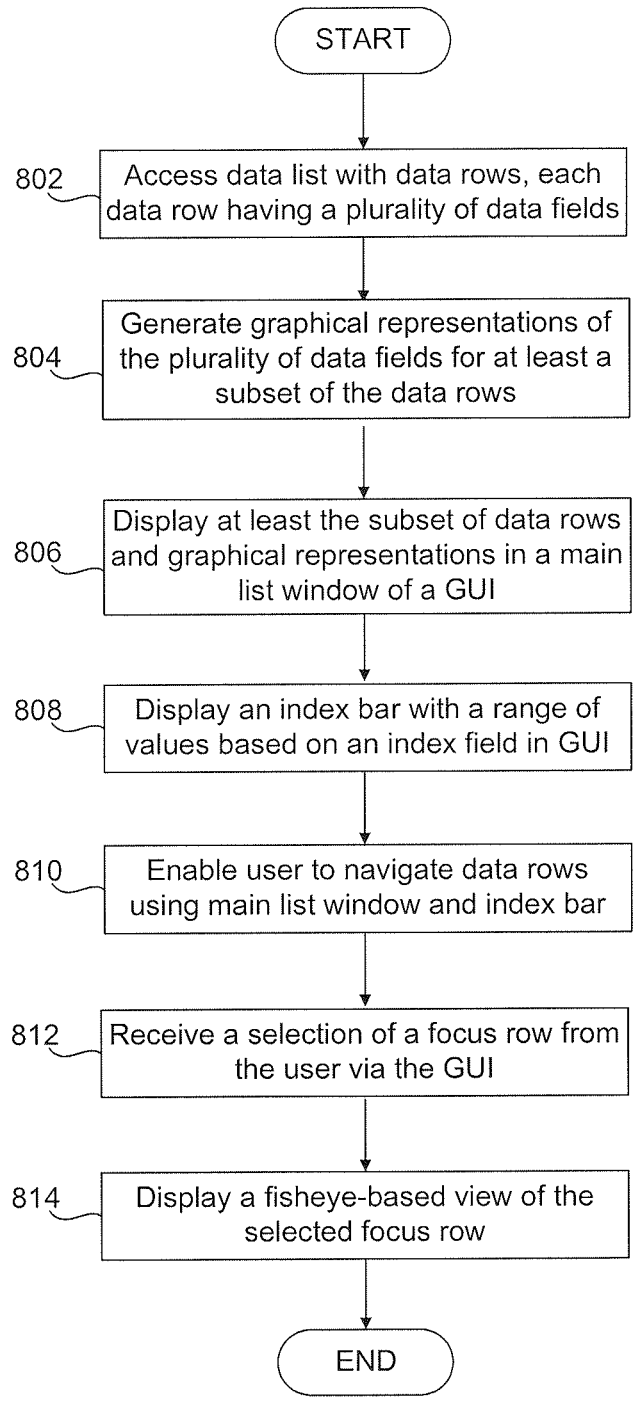
FIG. 8 is a process flow chart of an exemplary method for displaying a fisheye-based view of a data list on a mobile device, according to an embodiment.

FIG. 8 is a process flow chart of an exemplary method 800 for displaying a fisheye-based view of a large data list on a mobile device, according to an embodiment. Method 800 includes steps 802, 804, 806, 808, 810, 812, and 814. For ease of explanation, system 100 of FIG. 1, as described above, will be used to describe method 800, but is not intended to be limited thereto. Further, for ease of explanation, method 800 will be described in the context of device 200 of FIG. 2, as described above. Based on the description herein, a person of ordinary skill in the relevant art will recognize that method 800 can be executed on other types of client devices such as, for example and without limitation, a PDA, a laptop or personal computer, and similar types of devices. These other types of client devices are within the scope and spirit of the embodiments described herein.

Method 800 starts in step 802, which includes accessing a list of data (e.g., list data 234) comprising data rows, where each data row has a plurality of data fields. In step 804, graphical representations of the plurality of data fields for at least a subset of the data rows of the data list are generated. For example, the size of the data list may be so large that some data rows cannot be displayed in the current view displayed on the screen of the mobile device, and graphical representations of data fields for only the data rows that will be displayed on the screen may be generated. The graphical representations may be based on one of various visualization techniques or schemes including, but not limited to, color, shape, size, and graphical images. In an embodiment, the graphical representations may be based on the data type of each data field. For example, a data bar that graphically displays a data value may be generated for data fields having numerical data types (see, e.g., the "Number" row of table 600 of FIG. 6).

Method 800 then proceeds to step 806, in which the data rows (or a subset of the data rows), including the generated graphical representations for the respective data fields of each data row, are graphically displayed using a GUI (e.g., GUI 220) of the mobile device. In step 808, an index bar is also displayed in the GUI. The index bar includes a range of values based on an index field. The index field is one of the plurality of data fields of the data rows of the data list. The range of values displayed in the index bar represents the upper and lower bounds of values of the index data field. In an embodiment, if only a subset of data rows of the entire data list are displayed in the current view of the main list window, the index bar may also include a view indicator, as described above.

Also as described above, the index field may be based on the index of a table to which the list of data corresponds. Alternatively, a user at device 200 may select the index field using the GUI (e.g., by selecting a data field from a list of data fields displayed in a menu or separate window in GUI 220). A person skilled in the relevant art given this description would appreciate that method 800 may include additional steps involving displaying additional user interface controls (e.g., scroll button, as described above) and/or user interface elements as may be necessary.

Once the main list window and index bar are displayed, method 800 proceeds to step 810, which includes enabling the user to navigate the data rows of the data list using the displayed main list window and the index bar. The user may also select a focus row using the main list window. The focus row represents the data row that contains the data values of interest to the user. Steps 802, 804, 806, 808, and 810 may be performed by, for example, data visualization module 212.

Method 800 then proceeds to step 812, which includes receiving the user selection of the focus row. Step 812 may be performed by, for example, user navigation module 214. After the selection of the data row by the user, method 800 concludes at step 814, in which a fisheye-based view of the selected focus row is displayed in the main list window, as described above. Step 814 may be performed by, for example, data visualization module 212.

One benefit of method 800 is that it enables a user to view a large list of data on the limited screen space of a mobile device. The index bar (step 808) in combination with the fisheye-based view of a focus row in the main list window (step 814) further enable the user to quickly navigate the large data list for viewing relevant information. In addition, as described above, the visualization or graphical representation of data items or fields of each data row based on data types allows the data rows displayed in the main list window to present meaningful information to the user even at the smallest level of detail and size. Accordingly, the user may determine relative values of the plurality of data fields by viewing the graphically displayed data rows and the graphical representations of the plurality of data fields even if sizes of the displayed data rows are too small for the user to read specific values of the plurality of data fields.

VI. Example Computer System Implementation

Embodiments shown in FIGS. 1-8, or any part(s) or function(s) thereof, may be implemented using hardware, software modules, firmware, tangible computer readable media having instructions stored thereon, or a combination thereof and may be implemented in one or more computer systems or other processing systems.

Figure 9:
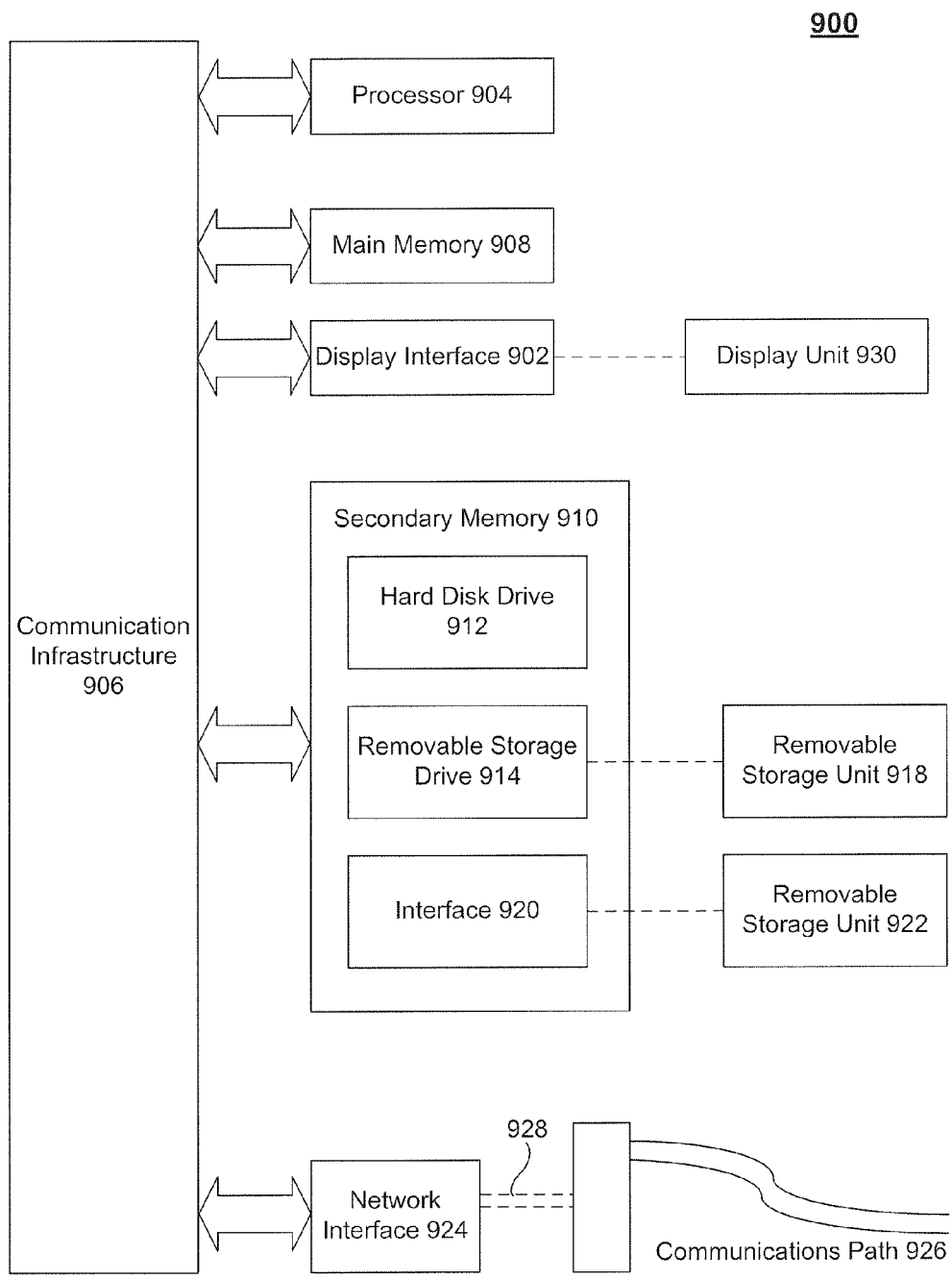
FIG. 9 is a diagram of an example computer system in which embodiments can be implemented.

FIG. 9 illustrates an example computer system 900 in which embodiments, or portions thereof, may be implemented as computer-readable code. For example, client device 110 in FIG. 1 and device 200 of FIG. 2, can be implemented in computer system 900 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-8.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art, removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of embodiments described herein, such as the stages in the methods illustrated by flowchart 800 of FIG. 8, discussed above. Accordingly, such computer programs represent controllers of the computer system 900. Where the invention is implemented using software, the software may be stored in a computer program product and loaded into computer system 900 using removable storage drive 914, interface 920, and hard disk drive 912, or communications interface 924.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

VII. Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for displaying a fisheye-based view of a data list on a mobile device, comprising:
    accessing said data list on the mobile device, said data list comprising data rows, wherein each data row has a plurality of data fields;
    generating graphical representations of the plurality of data fields, including an index field by which the data rows are organized, for at least a subset of the data rows of said data list based on respective values of each of the plurality of data fields;
    graphically displaying at least the subset of data rows and the generated graphical representations using a graphical user interface of the mobile device in a main list window in association with an index bar representation of a full range of index values for all of the data rows of the data list and corresponding to the index field,
    wherein a view indicator comprises a navigable portion of the index bar that enables navigation amongst all the data rows of the data list within the range of index values of the index bar, wherein the view indicator indicates a position of the graphically displayed subset of data rows in context of all the data rows, and includes a range of index values of the index bar corresponding to the subset of data rows;
    receiving a selection of a focus row of the subset from a user via the graphical user interface, wherein the focus row corresponds to a particular index value from the index bar; and
    graphically presenting the fisheye-based view of the selected focus row to the user in association with a corresponding fisheye-based view of the index bar, wherein the selected focus row is displayed at a higher level of detail than other graphically displayed data rows and wherein the index value of the index bar corresponding to the selected focus row and neighboring index values are displayed at a higher level of detail than they were displayed previous to the selection,
    wherein the user may determine relative values of the plurality of data fields by viewing the graphically displayed data rows and the graphical representations of the plurality of data fields even if sizes of the displayed data rows are too small to read specific values of the plurality of data fields.

2. The method of claim 1, wherein the graphically displaying comprises:
    providing, in the index bar, an upper bound index value and a lower bound index value corresponding to a first data row and a last data row of the subset, respectively.

3. The method of claim 1, further comprising:
    graphically displaying scroll buttons to enable the user to navigate the displayed data rows using the graphical user interface.

4. The method of claim 1, further comprising:
    sorting the data rows of said data list based on the index field; and graphically displaying the sorted data rows in the main list window.

5. The method of claim 4, wherein the index field includes values from a corresponding index of a table in a relation database of an enterprise system, wherein the data rows of the data list correspond to rows of the table.

6. The method of claim 1, further comprising:
    receiving a user selection of the index field via the graphical user interface.

7. The method of claim 1, wherein graphically presenting the fisheye-based view comprises graphically displaying the focus row and two or more rows near the focus row at higher levels of detail than other data rows displayed in the main list window,
    wherein the focus row is displayed at a highest level of detail and the two or more rows near the focus row are displayed at reduced levels of detail according to a distance of the two or more rows from the focus row.

8. The method of claim 1, wherein the graphical representations for the plurality of data fields are based on data types of the data fields.

9. The method of claim 1, wherein the graphically displaying further comprises:
    performing double buffering optimization using one or more cache memory devices of the mobile device when graphically displaying at least the subset of data rows and the generated graphical representations.

10. The method of claim 1, wherein the graphically displaying further comprises:
    performing a partial and asynchronous rendering optimization at the mobile device when graphically displaying at least the subset of data rows and the generated graphical representations.

11. A system for displaying a fisheye-based view of a data list on a mobile device, comprising:
    a data visualization module configured to access said data list on the mobile device, said data list comprising data rows having a plurality of data fields including an index field by which the data rows are organized,
    said data visualization module configure to:
        generate graphical representations of the plurality of data fields for at least a subset of the data rows of said data list based on respective values of each of the plurality of data fields,
        graphically display at the least the subset of data rows and the generated graphical representations using a graphical user interface of the mobile device in a main list window in association with an index bar representation of a full range of index values for all of the data rows of the data list and corresponding to the index field,
        wherein a view indicator comprises a navigable portion of the index bar that enables navigation amongst all the data rows of the data list within the range of index values of the index bar, wherein the view indicator indicates a position of the graphically displayed subset of data rows in context of all the data rows, and includes a range of index values of the index bar corresponding to the subset of data rows, and graphically present the fisheye-based view of the selected focus row to the user in association with a corresponding fisheye-based view of the index bar, wherein the selected focus row is displayed at a higher level of detail than other graphically displayed data rows and wherein the index value of the index bar corresponding to the selected focus row and neighboring index values are displayed at a higher level of detail than they were displayed previous to the selection; and a user navigation module configured to receive a selection of the focus row from a user via the graphical user interface, wherein a user may determine relative values of the plurality of data fields by viewing the graphically displayed data rows and the graphical representations of the plurality of data fields even if sizes of the displayed data rows are too small to read specific values of the plurality of data fields.

12. The system of claim 11, wherein the data visualization module is further configured to provide an upper bound index value and a lower bound index value corresponding to a first data row and a last data row of the subset, respectively.

13. The system of claim 11, wherein the data visualization module is configured to sort the data rows of said data list based on the determined index field, and graphically display the sorted data rows in the main list window.

14. The system of claim 11, wherein the data visualization module is configured to determine the index field by determining a corresponding index of a table in a relation database of an enterprise system, wherein the data rows of the data list correspond to rows of the table.

15. The system of claim 11, wherein the data visualization module is configured to determine the index field based on the receipt of a user selection of the index field via the graphical user interface.

16. The system of claim 11, wherein the data visualization module is configured to graphically present the fisheye-based view by graphically displaying the focus row and two or more rows near the focus row at higher levels of detail than other data rows displayed in the main list window, wherein the focus row is displayed at a highest level of detail and the two or more rows near the focus row are displayed at reduced levels of detail according to a distance of the two or more rows from the focus row.

17. The system of claim 11, wherein the graphical representations for the plurality of data fields are based on data types of the data fields.

18. The system of claim 11, wherein the data visualization module is further configured to perform double buffering optimization using one or more cache memory devices of the mobile device when graphically displaying at least the subset of data rows and the generated graphical representations.

19. The system of claim 11, wherein the data visualization module is further configured to perform a partial and asynchronous rendering optimization at the mobile device when graphically displaying at least the subset of data rows and the generated graphical representations.

20. A non-transitory computer readable storage medium having instructions stored thereon that, when executed by a computing device, cause the computing device to perform a method comprising:

accessing a data list on the computing device, said data list comprising data rows, wherein each data row has a plurality of data fields;

generating graphical representations of the plurality of data fields, including an index field by which the data rows are organized, for at least a subset of the data rows of said data list based on respective values of each of the plurality of data fields;

graphically displaying at least the subset of data rows and the generated graphical representations using a graphical user interface of the computing device in a main list window in association with an index bar representation of a full range of index values for all of the data rows of the data list and corresponding to the index field, wherein a view indicator comprises a navigable portion of the index bar that enables navigation amongst all the data rows of the data list within the range of index values of the index bar, wherein the view indicator indicates a position of the graphically displayed subset of data rows in context of all the data rows, and includes a range of index values of the index bar corresponding to the subset of data rows;

receiving a selection of a focus row of the subset from a user via the graphical user interface, wherein the focus row corresponds to a particular index value from the index bar; and graphically presenting the fisheye-based view of the selected focus row to the user in association with a corresponding fisheye-based view of the index bar, wherein the selected focus row is displayed at a higher level of detail than other graphically displayed data rows and wherein the index value of the index bar corresponding to the selected focus row and neighboring index values are displayed at a higher level of detail than they were displayed previous to the selection, wherein the user may determine relative values of the plurality of data fields by viewing the graphically displayed data rows and the graphical representations of the plurality of data fields even if sizes of the displayed data rows are too small to read specific values of the plurality of data fields.

21. The method of claim 1, wherein the view indicator of the index bar includes a highlighted range of index values of the index bar corresponding to the subset of data rows.

22. The method of claim 1, wherein the view indicator comprises a black box indicating a selection of a portion of the index values of the index bar.

23. The method of claim 1, wherein the index bar comprises a scroll bar navigable by adjusting the view indicator relative to the index bar.

* * * * *